Aug. 23, 1960 W. P. FITZGERALD ET AL 2,949,952
TUBELESS TIRE
Filed Nov. 15, 1955 2 Sheets-Sheet 1
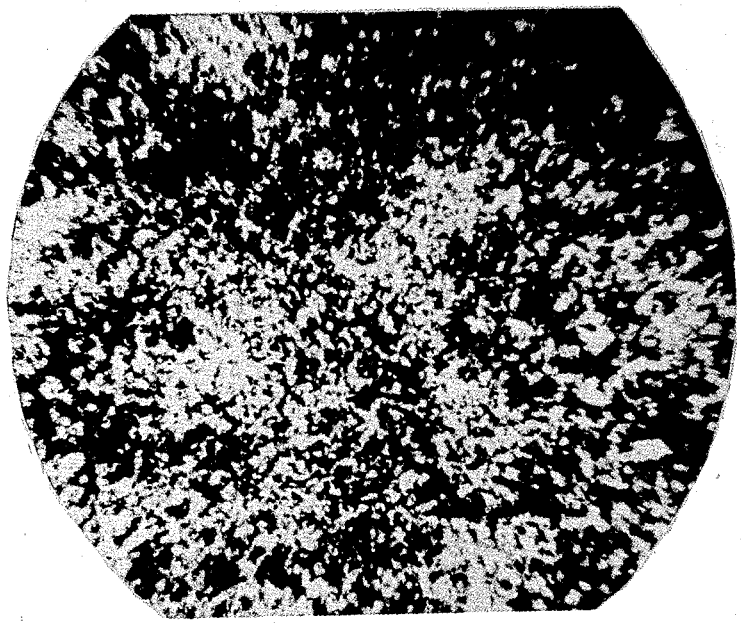
FIGURE - II
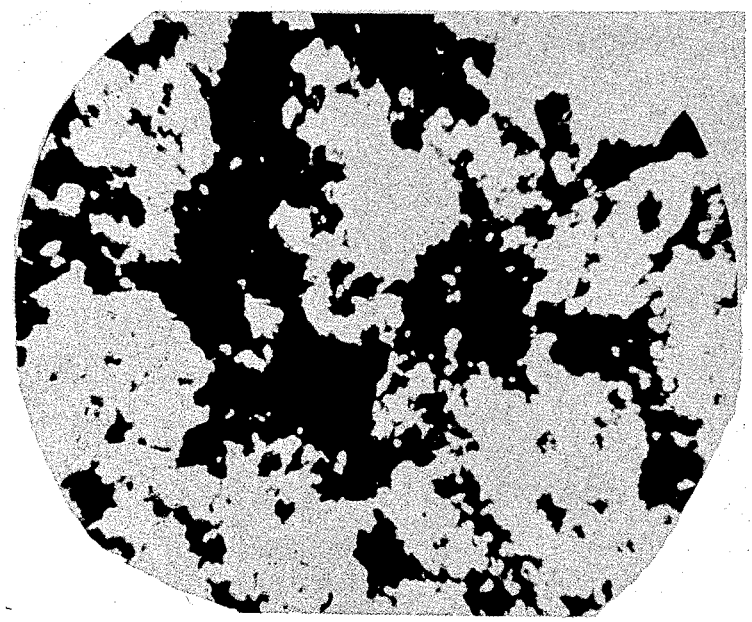
FIGURE - I
William P. FitzGerald
Fred W. Banes        Inventors
Addison W. Hubbard
By *W. H. Smyers*   Attorney Aug. 23, 1960  W. P. FITZGERALD ET AL  2,949,952
TUBELESS TIRE
Filed Nov. 15, 1955  2 Sheets-Sheet 2
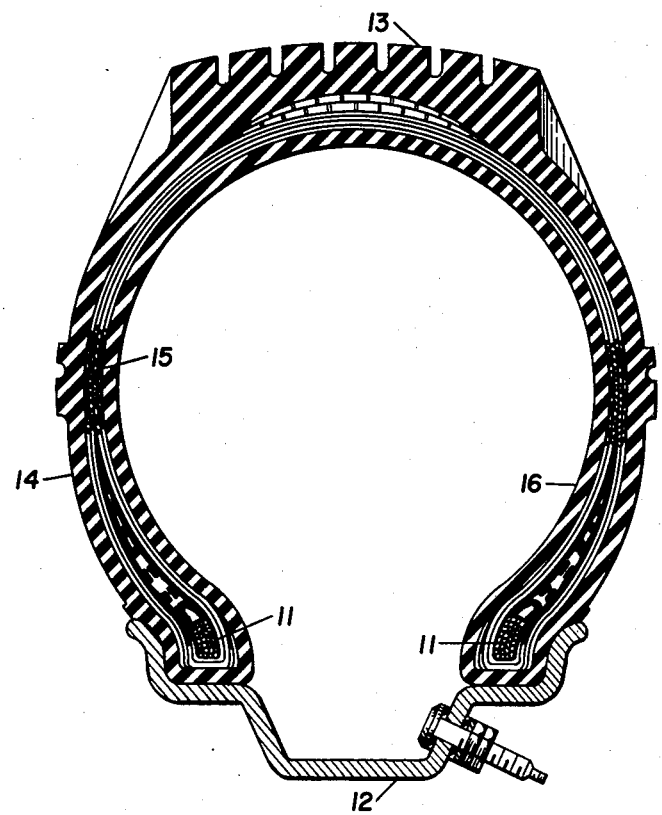
FIGURE - III
William P. FitzGerald
Fred W. Banes
Addison W. Hubbard   Inventors
By *W. H. Smyers*   Attorney

United States Patent Office 2,949,952
Patented Aug. 23, 1960

2,949,952

TUBELESS TIRE

William P. Fitzgerald, Florham Park, and Fred W. Banes and Addison W. Hubbard, Westfield, N.J., assignors to Esso Research and Engineering Company, a corporation of Delaware Filed Nov. 15, 1955, Ser. No. 547,004

11 Claims. (Cl. 152—330)

This invention relates to the preparation of novel compositions containing a rubbery polymer such as a hydrocarbon copolymer or homopolymer, materials which are difficult to disperse in rubbery polymers such as rubber additives including zinc oxide, fillers or pigments, and improved dispersing aids comprising the product obtained by reacting an isoolefin-multiolefin rubbery copolymer with unsaturated polar organic compounds containing carbon, hydrogen, and nitrogen and/or oxygen.

More particularly, the invention relates to compositions containing vulcanizable or non-vulcanizable rubbery hydrocarbon polymers and copolymers such as natural or synthetic rubbers, polyisobutylene etc. a pigment, and an improved dispersing aid. The dispersing aid, which is also a processing aid, comprises the reaction product of a rubbery copolymer containing a major proportion of a $C_4$–$C_8$ isoolefin and a minor proportion of a $C_4$–$C_8$ diolefin, with nitrogen and/or oxygen containing unsaturated polar organic compounds such as acrylonitrile, vinyl pyridine, vinyl lutidines, acrylic esters, methacrylic esters, etc. The present invention is a continuation-in-part of application, Serial No. 478,906, filed December 30, 1954, now Patent No. 2,901,458, August 25, 1959, in the names of Fred W. Banes and William P. Fitzgerald.

The invention will be best understood by reference to the accompanying drawing, in which:

Figure I is a photomicrograph of a conventional unvulcanized butyl rubber composition containing a dispersed pigment;

Figure II is a photomicrograph of an unvulcanized butyl rubber composition containing a dispersed pigment in accordance with the present invention; and Figure III is a cross-sectional view of a pneumatic tubeless tire employing therein an improved butyl rubber-pigment dispersion in accordance with the present invention.

Butyl rubber is a high molecular weight hydrocarbon copolymer of a monoolefin such as isobutylene with a minor amount of a multiolefin, preferably a conjugated diolefin of 4 to 6 carbon atoms, such as butadiene or especially isoprene. Methods for producing polymers of this type are described in U.S. Patent 2,356,128. Butyl rubber copolymers have a relatively low unsaturation, as indicated by an iodine number of about 0.5 to 50, and for use as a synthetic rubber, preferably have a Staudinger molecular weight of at least about 20,000 up to about 100,000 or 200,000.

For the purposes of the present invention, wherein a copolymer of an isoolefin and a multiolefin, is reacted with polar organic compounds to produce improved dispersion aids, the copolymer should in general have a Staudinger molecular weight range from about 4,000 to about 60,000, preferably about 10,000 to 40,000. The iodine number (Wijs) should be about 20 to 100, preferably about 30 to 80. In other terms, the isoolefin-multiolefin copolymer should have a mole percent unsaturation of about 5 to 50, preferably about 7 to 40. The rubbery copolymer preferably contains about 70 to 95 weight percent of a $C_4$–$C_8$ isoolefin and about 5 to 30 weight percent of a $C_4$–$C_6$ conjugated diolefin.

The unsaturated polar monomers to be used according to the present invention for reaction with the isoolefin-multiolefin copolymer, may be selected from a wide group of organic compounds. Suitable nitrogen-containing monomers include acrylonitrile, methacrylonitrile, vinyl pyrimidines, vinyl pyridine and its alkyl derivatives such as vinyl parvolines, vinyl picolines, vinyl collidines, etc.

Oxygen-containing monomers which may be used include acrylic esters and methacrylic esters of the various alcohols ranging, for instance, from 1 to 20 carbon atoms, e.g. methyl, ethyl, butyl, decyl, lauryl, hexadecyl, octadecyl, etc., or various vinyl ethers, e.g. vinyl isobutyl ether, vinyl esters such as vinyl acetate, etc. Also, one may use unsaturated polar compounds of other polar elements such as phosphorus, e.g. bis(betachloroethyl) vinyl phosphonate. Such polar compounds as vinyl triethoxy silane are also operatives. Mixtures of two or more different materials in the same class or different classes of the above materials may be used, especially for making polyfunctional reaction products.

The proportion of the above-described polar monomers to the isoolefin-multiolefin copolymer normally should range from about 5 to 200, preferably 10 to about 100 parts by weight of the polar monomer to 100 parts by weight of the isoolefin-multiolefin copolymer.

In order to effect the desired reaction, it is desirable to have a diluent or solvent present to the extent of about 1 to 10 volumes per volume of reactants, or about 100 to 1,000 cc. per 100 grams of reactants. Such solvents may be selected from those that are unreactive in the presence of free radicals. Hydrocarbon solvents such as cyclohexane, benzene, n-hexane, petroleum ether, n-heptane, n-octane, etc., or mixtures of these may be used and are preferred. Oxygenated solvents such as tertiary butyl alcohol, di-alkyl ethers, etc., may also be used.

It is also desirable to employ a catalyst to accelerate the reaction of the polar monomer with the butyl rubber. Materials such as benzoyl peroxide, ditertiary butyl peroxide, cumene hydroperoxide, tertiary butyl hydroperoxide, 2,2-bis tertiary butyl peroxy butane, hydrogen peroxide, etc., may be used. Generally, the amount thereof should be about 0.1 to 2.0%, preferably about 0.3 to 1.0%, based on reactants.

The temperature at which the reaction takes place is partly dependent on the thermal decomposition temperature of the peroxide used, but is usually about 50° to 250° C., preferably about 75° to 175° C., the time required being from about 1 to 10 hours, generally about 2 to 5 hours. If the reactants, such as acrylonitrile and vinyl pyridine, are particularly active in polymerization tendency, and perhaps therefore may tend to make a homopolymer instead of adding on to the isoolefin-multiolefin copolymer, the polar monomer may be added in successive increments or continuously over a period of time. In general, any of the methods disclosed in application Serial No. 478,906 for reacting the polar monomer with an isoolefin-multiolefin rubbery copolymer are suitable.

The resulting reaction products are polar derivatives of the isoolefin-multiolefin rubbery copolymer and constitute new and highly useful dispersing aids for pigments in butyl rubber, GR-S rubber, polyisobutylene, etc. The amount of dispersing aid employed is generally between about 0.1 to 30.0, preferably 3 to 10 parts by weight per 50 to 200 (e.g. 100) parts of an equal mixture of pigment and butyl rubber or other polymers. Smaller quantities of the dispersing aid are required if the amount of pigment is decreased. The dispersion aid is added prior to vulcanization in any suitable manner as in the case of other dispersing aids. Mixing temperatures generally vary from about 0° to 200° C. For instance, when adding the dispersing aid to butyl rubber or GR-S rubber (a butadiene-styrene copolymer), according to the invention, the rubber is preferably maintained during mixing, at a temperature between about 0° to 50° C. depending upon the characteristics of the particular rubber involved. Mixing is advantageously performed in a conventional rubber-mill, Banbury mixer etc. For processing non-vulcanizable rubbery hydrocarbon polymers such as polyisobutylene, the mixing temperature is preferably between about 100° to 200° C. Mixtures of both types of rubbery polymers are advantageously processed at temperatures between about 25° to 150° C.

Suitable pigments employed in accordance with the present invention include about 5 to 200 preferably about 20 to 80 parts by weight per 100 parts by weight of rubbery polymers of carbon black, calcium carbonate, ferric hydroxide, chrome-yellow, Prussian blue, phthalocyanine, clays such as bentonite, montmorillonite; kieselguhr, silica, silica-alumina, titanium dioxide, etc. Improved dispersions in rubber of other additives such as zinc oxide are also obtained by employing the dispersion aids in accordance with the present invention.

For vulcanization purposes, 100 parts by weight of the butyl rubber copolymer, may be mixed with about:

0–20 parts by weight anti-oxidant
20–75 parts by weight carbon black
0–1 parts by weight p-dinitroso benzene
0–5 parts by weight stearic acid
0–30 parts by weight plasticizer oil
1–30 (preferably 3–20) parts by weight zinc oxide
0.5–5.0 parts by weight sulfur
0.5–2.0 parts by weight tetra-alkyl thiuram sulfide
0–2.0 parts by weight benzothiazyl disulfide
0–2.0 parts by weight mercapto-benzothiazole
0.1–30 parts by weight dispersing aid The general characteristics for a suitable plasticizer hydrocarbon oil may be as follows; or its equivalents:

|  | Preferred | Minimum | Maximum |
|---|---|---|---|
| API° Gravity | 15–28 | 10 | 35 |
| Flash Point, °F. (Open cup method) | 525 | 300 | 700 |
| Pour Point, °F | 15–30 | 10 | 60 |
| SSU @ 100° F | 100–12,000 | 50 | 20,000 |

The carbon black added may be a channel carbon black, such as HPC black, MPC black, EPC black, or a furnace black such as HAF black, SAF black, HMF black, etc., or any combination of such blacks.

The cure of the total composition containing the dispersion aid, pigment, and butyl rubber may be effected, preferably at a temperature between about 200° to 400° F., in the presence of sulfur and/or a sulfur-containing curing agent which is preferably combined with such materials as one or more of the following, or their equivalents:

(1) A zinc dialkyl polythiocarbamate
(2) Lead oxide
(3) p-quinone di-oxime
(4) Benzothiazyl disulfide and p-quinone dioxime
(5) Lead oxide and p-quinone dioxime dibenzoate
(6) A polyalkyl thiuram sulfide As regards the anti-oxidant, small amounts of any conventional anti-oxidant for butyl rubber such as diphenyl ethylenediamine, phenyl-alpha-naphthylamine, phenyl-beta-naphthylamine, alkylated phenols or cresols such as 2,6-ditertiary butyl paracresol, hydroquinone monobenzyl ether, the condensation product of phenol and acetone, acetone-diphenyl amine condensation products, etc. may be employed. Alkylated bis-phenols have been found particularly advantageous, as have been alkylated amino phenols and alkylated diphenyl amines. The alkyl groups generally do not contain more than about 16 carbon atoms.

In place of or in conjunction with butyl rubber, the following rubbery polymers may be employed: a copolymer of butadiene and styrene (GR-S), natural rubber, and Buna-N rubber which is the copolymerization product of butadiene and acrylonitrile.

GR-S rubber is preferably obtained by polymerizing butadiene and styrene in aqueous emulsion. Polymerization is initiated by regulating the monomer mixture to a temperature between about −40° C. and about +100° C., preferably between about −40° C. to about +50° C., in the presence of a material capable of accelerating the polymerization reaction such as a peroxide or persulfate with or without added solvents. When polymerization is complete the polymer may be separated from unreacted monomer and/or solvent and water generally by coagulation and filtration followed by distillation.

The above general process for producing GR-S rubber may likewise be generally employed for producing Buna-N rubber, which is a copolymer of butadiene and acrylonitrile and other rubbery polymers as hereinafter indicated. It may be applied, for example, to other rubbery polymers obtained by the polymerization in aqueous emulsion of conjugated diolefins, such as butadiene, isoprene, piperylene, dimethyl butadiene, 2-chlorobutadiene-1,3, taken singly or in combination; or to emulsion copolymerizates obtained by polymerizing such diolefins in combination with unsaturated co-monomers, i.e., copolymerizable compounds containing a single terminal methylene group such as styrene (supra), and also homologues of styrene, such as alpha methyl styrene, para methyl styrene, alpha methyl para methyl styrene, nitriles of low molecular weight unsaturated acids such as acrylonitrile (supra), methacrylonitrile, chloroacrylonitrile, methyl acrylate, methyl methacrylate and ketones such as methyl vinyl ketone or mixtures thereof.

Other synthetic rubbery polymers employed according to the present invention may be polymers of substituted butadienes-1,3 which include butadiene-1,3 or its homologs such as isoprene and 2,3-dimethyl butadiene, where the substituents are either chlorine or cyano groups, or the synthetic rubbers may be rubbery copolymers of various of the butadienes-1,3 with other ethylenic monomers, and in this case either the butadienes or the ethylenic monomer or both the butadienes and the ethylenic monomer may contain substituents of chlorine or cyano groups. The copolymer generally contains at least 50% and preferably at least 70% by weight of one of the butadienes-1,3. Such compounds useful in the present invention include polymers of 3-chloro butadiene-1,3; 3-bromo butadiene-1,3; 3-cyano butadiene-1,3; chloro isoprene; bromo isoprene; and cyano isoprene. They also include polymers of butadiene-1,3 with vinylidene chloride, p-chloro styrene, or methyl alpha chloro acrylate; copolymers of 3-chloro butadiene-1,2 with the above and/or with acrylonitrile, methacrylonitrile, etc.; copolymers of 3-cyano butadiene-1,3 with the above; copolymers of 2,3-dimethyl butadiene with either 3-chloro butadiene-1,3 or 3-cyano butadiene-1,3 etc. Those compounds which are copolymerized with the butadienes are advantageously ethylenic monomers and it is preferred that they contain a $CH_2=C<$ group. Vulcanization may be obtained either at ordinary room temperature or at higher temperatures, depending upon the choice of vulcanization accelerators.

High molecular weight polyisobutylene, e.g., having a Staudinger molecular weight above about 180,000 and preferably about 200,000 to 500,000 may also be processed in an improved manner by employing reaction products of unsaturated polar organic compounds with iso-olefin-multiolefin rubbery copolymers according to the invention. The rubbery polymer of polyisobutylene is advantageously made by polymerizing isobutylene in about 1 to 10 volumes of methyl chlorides or other lower alkyl halide at temperatures between about −100° to −160° F., using a strong Friedel-Crafts catalyst such as aluminum chloride dissolved in methyl chloride, and preferably using isobutylene of at least 99% purity. Polymerization may be conveniently carried out in a commercial plant normally intended for making butyl rubber.

The details and advantages of the present invention will be better understood from a consideration of the following experimental data:

DISPERSION AID NO. 1

A mixture of 100 grams of high unsaturation iso-butylene-isoprene copolymer (12,500 Staudinger, 7.40 mole percent unsaturation made by copolymerizing 3 parts by weight of isobutylene with 1 part of isoprene in 3 volumes of methyl chloride as solvent, solid $CO_2$ in naphtha as refrigerant, and a solution of $AlCl_3$ in $CH_3Cl$ as catalyst), 280 grams of n-heptane, and 0.3 gram of benzoyl peroxide was placed in a 1000 cc. flask. This mixture was stirred and heated until the temperature had reached 95° C. A solution of 0.2 gram of benzoyl peroxide in 15 cc. of di-ethyl ether was mixed with 10 grams of redistilled acrylonitrile and diluted to 100 cc. with n-heptane. This mixture was added slowly and continuously to the polymer solution. The addition of the acrylonitrile solution consumed 45 minutes.

The reflux temperature was maintained at 95° C. for 4 hours. The reaction mixture was cooled, transferred to a short path still and heated to a pot temperature of 45° C. at 1 mm. of Hg absolute to strip off the solvent and unreacted acrylonitrile. The product contained 0.91 weight percent nitrogen, equivalent to 3.4 weight percent acrylonitrile. The product was an oil-soluble copolymer.

DISPERSION AID NO. 2

A mixture of 50 grams of high unsaturation iso-butylene-isoprene copolymer (11,400 Staudinger, 7.7 mole percent unsaturation), 125 grams of n-heptane, and 0.3 gram of benzoyl peroxide was heated to 95° C. in a 1000 cc. flask. A solution of 10 grams of freshly distilled 2-vinyl pyridine and 0.2 gram of benzoyl peroxide in 90 grams of pyridine was slowly added to the polymer solution over a 94 minute interval. The reaction mixture was stirred at 95° C. for an additional 30 minutes after which it was cooled and stripped of solvent and unreacted vinyl pyridine. The product weighed 52.5 grams and contained 0.56 weight percent nitrogen; equivalent to 4.22 weight percent vinyl pyridine. The product was a copolymer as demonstrated by its solubility in oil.

DISPERSION AID NO. 3

A solution of 50 grams of an isobutylene-isoprene copolymer (19,400 Staudinger, 7.5 mole percent unsaturation) in 120 grams of n-heptane was mixed with 45 grams of lauryl methacrylate (made from a commercial lauryl alcohol containing about 3% $C_{10}$, 61% $C_{12}$, 23% $C_{14}$, 11% $C_{16}$ and 2% $C_{18}$ alkanols), 250 cc. of benzene, and 1.0 gram of benzoyl peroxide. This mixture was charged to a 1 liter stainless steel bomb and heated to 90° C. for 4 hours.

At the expiration of this time, the reaction mixture was recovered and vacuum stripped to remove the solvent and unreacted methacrylate. The product amounted to 56 grams.

DISPERSION AID NO. 4

A mixture of 50 grams of an isobutylene-isoprene copolymer (11,400 Staudinger, 7.7 mole percent unsaturation), 125 grams of n-heptane, 45 grams of stearyl methacrylate, 250 cc. of benzene, and 1.0 gram of benzoyl peroxide was charged to a 1 liter stainless steel bomb. The bomb was agitated in the conventional manner and heated to 90° C.; this temperature was maintained for 4 hours.

After cooling, the reaction mixture was withdrawn from the bomb and distilled in a short path still to an overhead temperature of 160° C. at 0.6 mm. of Hg absolute. The product, a light, elastic material weighed 69 grams.

DISPERSION AID NO. 5

A one liter stainless steel bomb was charged with a mixture consisting of 50 grams of high unsaturation isobutylene-isoprene copolymer (11,400 Staudinger, 7.7 mole percent unsaturation), 45 grams of lauryl methacrylate, 360 cc. of n-heptane, and 2.0 grams of di-tertiary butyl peroxide. The bomb was shaken on a conventional shaker and heated at 150° C. for 4 hours.

At the end of this time, the bomb was cooled and the reaction-mixture transferred to a short path still where it was stripped to an overhead temperature of 140° C. at 0.25 mm. of Hg absolute. The product weighed 60 grams.

DISPERSION AID NO. 6

A 50 gram sample of high unsaturation isobutylene-isoprene copolymer (31,000 Staudinger, 13.1 mole percent unsaturation) was dissolved in 273 grams of n-heptane. To this solution was added 40 grams of freshly distilled vinyl acetate and 0.5 gram of benzoyl peroxide. The resulting mixture was placed in a one liter stainless steel bomb and heated to 95° C. for 4 hours.

At the end of this time, the mixture was placed in a short path still and the solvent and unreacted ester removed by distilling to an overhead temperature equivalent to 150° C. at atmospheric pressure. The product weighed 64.3 grams.

Example I

Two butyl rubber compositions were prepared according to the following recipe:

| Component | Parts by Weight | |
|---|---|---|
| | Sample No. 1 | Sample No. 2 |
| Isobutylene-Isoprene Copolymer (GR–I 18) | 100 | 100 |
| Carbon Black (M.P.C. black) | 30 | 30 |
| Dispersion Aid No. 2 | | 5 |

The components were mixed on a conventional rubber mill at room temperature (20° C.) for 15 minutes. The compounded stocks were dissolved in n-heptane to make solution of 10% solids. Samples of the two solutions were diluted to 0.05% solids in small test tubes and viewed against direct light.

The solution containing sample #1 was transparent and clear except for clearly discernable agglomerates of carbon after 24 hours. However, the solution containing sample #2, the modified copolymer, was uniformly opaque. Furthermore, individual particles of carbon black were hard to detect. No appreciable sedimentation had occurred after 3 days.

The above behavior is evidence of the improved dispersion of carbon black particles obtained by incorporating the modified copolymer into dry rubber mixes according to the present invention.

Example II

To demonstrate quantitatively the degree and stability of dispersion of carbon black secured with and without the use of the experimental dispersing aid, sample stocks were prepared at room temperature according to the following recipe:

| Component | Parts by Weight | |
|---|---|---|
| | Sample #3 | Sample #4 |
| GR-S (71% Butadiene, 29% Styrene) | 100 | 100 |
| Zinc Oxide | 5 | 5 |
| Stearic Acid | 1 | 1 |
| Sulfur | 2.5 | 2.5 |
| Benzothiazyldisulfide | 1.5 | 1.5 |
| Carbon Black (M.P.C. black) | 30 | 30 |
| Dispersion Aid No. 2 | | 5 |

The above stocks were dissolved in n-heptane to produce solutions having 10% solids. Exactly 100 cc. portions of each solution were centrifuged for 30 minutes at 1500 r.p.m. The liquid containing unsettled pigment was then decanted off and an additional 90 cc. of each solution added to their respective centrifuge tubes. The samples were again centrifuged for 30 minutes at 1500 r.p.m., after which the supernatant liquid was again poured off. The precipitated fractions were recovered and dried in a vacuum oven at nine p.s.i. absolute. The weights of carbon black recovered were as follows:

WEIGHT OF CARBON BLACK (GMS.)

| Sample #3 | Sample #4 |
|---|---|
| 0.4768 | 0.3058 |

Since large, coarse particles will settle faster in a liquid medium than finely divided particles, it is manifest that a better degree of dispersion was achieved during mill mixing when the dispersing aid was present according to the invention.

*Example III*

Microscopic examination of carbon black dispersions in unvulcanized stock gives an accurate picture of the better pigment dispersion achieved by the use of dispersing aids.

Five sample stocks were compounded at room temperature (20° C.) from the same basic recipe (sample Nos. 8 and 9), two of the stocks being controls.

| Component | Parts by weight |
|---|---|
| GR-I 18 | 100 |
| Zinc Oxide | 5 |
| Sulfur | 2 |
| Tetramethyl thiuram disulfide | 1 |
| Mercapto benzothiazole | 0.5 |
| Carbon Black (M.P.C. black) | 30 |

| Sample No. | 5 | 6 | 7 | 8 | 9 |
|---|---|---|---|---|---|
| Dispersion Aid No. 2 | 10 | 6 | 3 | | |
| Stearic Acid | | | | | 3 |
| White Oil | | | | 5 | |

The sample stocks after compounding were dissolved in n-heptane to produce solutions having 5% solids. Films were formed on Formvar membrane from the respective solutions and examined under a microscope at 970×.

In samples 5, 6 and 7, the carbon black particles were uniform in size and evenly dispersed. Control samples 8 and 9 containing white oil and stearic acid respectively, contained agglomerates of carbon black particles and uneven distribution of the pigment in the compound.

These effects are illustrated in the accompanying photomicrographs in which:

Figure I is a photomicrograph at 970× of butyl rubber composition "9" of Example III. An inspection of the photomicrograph reveals that the carbon black particles were not dispersed evenly and were badly agglomerated.

Figure II is a photomicrograph of butyl rubber composition "6" which contains a dispersion aid in accordance with the invention. An inspection of said photomicrograph shows that the carbon black was substantially uniformly dispersed throughout the butyl rubber composition in a manner far superior to the identical composition having the usual amount of a conventional dispersion agent (stearic acid).

One of the most practical and beneficial effects gained through better dispersion of compounding ingredients is the improvement in the physical properties of the final vulcanizates. Illustrative of the improved dispersion achieved by the use of the modified copolymer according to the invention are data on tear strength exhibited by vulcanizates of samples 5, 6 and 7, compared to 8 of the prior art.

All samples were cured for 120 minutes at 300° F.

| Sample | Tear strength, lbs./inch |
|---|---|
| 5 | 128 |
| | 145 |
| Av. | 137 |
| 6 | 147 |
| | 127 |
| Av. | 137 |
| 7 | 107 |
| | 112 |
| Av. | 110 |
| 8 | 84 |
| | 87 |
| Av. | 85 |

It is evident that significantly higher tear strengths have been imparted to those stocks containing the dispersing aid as a result of more complete and effective dispersion of the pigments.

*Example IV*

To demonstrate the efficacy of the modified copolymer as a processing aid as well as a dispersing aid, in unvulcanizable hydrocarbon polymers, two compounds were prepared of the following recipes:

| Component | Parts by Weight | |
|---|---|---|
| | Sample #9 | Sample #10 |
| Polyisobutylene (Staudinger Molecular Wt.= 250,000–300,000) | 100 | 100 |
| Carbon Black (M.P.C. black) | 50 | 50 |
| Dispersion Aid No. 2 | 10 | |

In the case of the control (sample #10), the polyisobutylene was milled at 300° F. until a band had been formed after which the pigment was added. This addition of carbon black required 26 minutes.

The other sample (9) of polyisobutylene was milled at 300° F. The processing aid was then added and assisted in the rapid formation of a tight band. The introduction of the carbon black was accomplished in only 15 minutes.

Samples of both stocks were dissolved in n-heptane to form 5% solutions from which thin films were dipped on Formvar membrane. Microscopic examination at 970× revealed a uniform dispersion of pigment in sample #9 whereas agglomeration and uneven distribution of carbon black particles were discernable in control sample #10. These effects are evidence of the dual function of both processing aid and dispersing aid of butyl rubber reacted with vinyl pyridine, acrylonitrile, methacrylonitrile, vinyl acetate, vinyl triethoxy silane, etc.

The dispersion aids of the present invention are also useful to facilitate the production of substantially stable dispersions of white and pastel colored pigments in rubbers and polyisobutylene. A representative range of components in the production of white butyl rubber vulcanizates is as follows:

| Component: | Parts by weight |
|---|---|
| Rubber | 100 |
| $TiO_2$ | 5–100 |
| Zinc oxide | 1–50 |
| Magnesium oxide | 0–100 |
| Ultramarine blue | 0–2.0 |
| Sulfur | 0.1–20 |
| Accelerator | 0.1–5.0 |

Referring now to Figure III of the drawing, a pneumatic tubeless tire is shown which is mounted on a conventional tubeless tire wheel rim 12. The tubeless tire comprises a hollow toroidal-type member which is substantially U-shaped in cross-section by virtue of an open portion which extends around the inner periphery of the member. In other words, the member is of a tubular type structure which has a cross-section in the form of an open-bellied body with spaced terminal portions to define a member generally resembling a horseshoe, wherein the open portion of the horse-shoe faces toward the interior circumference of said member. The terminal portions of the tubular member constitute bead portions 11—11 of the tire, inside of which are a plurality of bead wires adhesively imbedded and molded in a rubber.

The outer surface of the bead portion is advantageously shaped so as to function as an air sealing means, such as a plurality of ribs to aid in adhesion to rim 12 when the tire is inflated. The remaining outer surface of the tire also includes tread area 13 and sidewalls 14. The remaining construction of the tire may vary according to conventional fabrication but in generall the tire is a multi-layered type of structure with an outer layer as above-mentioned. The layer next adjacent the outer layer generally comprises a carcass 15 which includes a rubber, such as butyl rubber, natural rubber, GR–S rubber, etc., which has incorporated therein a fabric composed of a plurality of cotton, rayon, or nylon cords.

The tire also includes an inner lining 16, advantageously made from butyl rubber which must be substantially impermeable to air. The lining may advantageously comprise a rubbery copolymer of about 70–99 weight percent of a $C_4$–$C_7$ isoolefin, such as isobutylene, and about 1–30 weight percent of a $C_4$–$C_{14}$ multiolefin, such as isoprene which has been at least partially vulcanized at least at about 240°–350° F. with from about 0.2–10.0 weight percent sulfur based on the weight of the copolymer. The above multi-layers, at least three in number, are conventionally bonded and adhered together; for example, by vulcanization to form a tire of a unitary structure.

The rubber compositions of the present invention, i.e. including a rubbery polymer, a pigment, and a reaction product of an unsaturated polar organic compound and isoolefin-multiolefin copolymer, may be generally employed throughout the tire, but are especially desirable in the side wall area because of their improved uniformity of pigment dispersion. Also, because of the homogeneity of the vulcanized composites, the compositions of the present invention are useful in the inner lining and tread area of tubeless tires.

A tubeless tire may comprise a casing and an outer layer including a tread, sidewall, outer bead portions, etc., of butyl rubber, natural rubber, GR–S rubber, or Buna-N rubber, or minor proportions of reclaimed mixtures of these rubbers any of which have been blended with a pigment and a minor proportion of the reaction product of butyl isoolefin-multiolefin copolymer and unsaturated organic polar compounds according to the invention. The tire also preferably includes, in the intermediate layer or carcass, any of the above rubbers or combinations thereof, especially to include compositions containing butyl rubber, or GR–S rubber which have been vulcanized in the presence of a pigment and minor proportions of an isoolefin-multiolefin copolymer which has been modified with acrylonitrile, vinyl pyridine, etc., according to the invention.

In another embodiment of the invention, the inner layer of the tire, which may be butyl rubber alone, or butyl rubber and a minor proportion of either reclaimed natural rubber or a mixture of reclaimed natural and GR–S rubber, etc., is compounded with a minor proportion of carbon black and about 0.1–30% of an isoolefin-multiolefin copolymer reacted with acrylonitrile or vinyl pyridine. This inner layer is then at least partially vulcanized by heating for about 3 to 60 minutes or more, at about 100 to 350° F. or higher with about 0.2 to 40.0 (especially 1–25) weight percent sulfur on a basis of the weight of the total rubber present.

While there are above described a number of specific embodiments of the invention, it is obviously possible to produce other embodiments and various equivalent modifications and variations thereof without departing from the spirit of the invention or the scope of the appended claims.

What is claimed is:

1. A composition comprising a homogeneous admixture of 100 parts by weight of a rubbery polymer selected from the group of homopolymers of conjugated diolefins, copolymers of at least 50% by weight of conjugated diolefins and a balance of at least one copolymerizable ethylenic monomer, isoolefin-multiolefin copolymers containing a minor portion of multiolefins, said multiolefins being in copolymerized form, said copolymers having an iodine No. of about 0.5 to 50 and having a Staudinger molecular weight of about 20,000 to 200,000, and polyisobutylene having a Staudinger molecular weight of above about 180,000, about 5 to 200 parts of a pigment, said pigment being selected from the group consisting of carbon black, calcium carbonate, ferric hydroxide, chrome yellow, Prussian blue, phthalocyanine, clays, kieselguhr, silica, silica-alumina and titanium dioxide, and about 0.1 to 30 parts of a dispersing aid consisting of the reaction product of 100 parts by weight of an isoolefin-multiolefin copolymer having a mole percent unsaturation of about 5 to 50 and a Staudinger molecular weight of about 4,000 to 60,000, with about 5 to 200 parts by weight of a polar organic monomer containing a terminal $CH_2=C<$ group and selected from the group consisting of acrylonitrile, vinyl pyrimidine, vinyl pyridine, acrylic acid esters, methacrylic acid esters, vinyl ethers and vinyl esters.

2. Composition according to claim 1, in which the polar compound is acrylonitrile.

3. Composition according to claim 1 in which the rubbery polymer is a copolymer of butadiene and styrene.

4. Composition according to claim 1 in which the rubbery polymer is an isoolefin-multiolefin copolymer having an iodine No. of about 0.5 to 50.

5. Composition according to claim 1 in which the polar compound is 2-vinyl pyridine.

6. Composition according to claim 1 in which the polar compound is an acrylic ester.

7. Composition according to claim 1 in which the rubbery polymer is polyisobutylene.

8. A composition comprising a homogeneous admixture of 100 parts by weight of an isoolefin-multiolefin copolymer having an iodine No. of about 0.5 to 50 and a Staudinger molecular weight of about 20,000 to 200,000, about 5 to 200 parts by weight of a pigment, said pigment being selected from the group consisting of carbon black, calcium carbonate, ferric hydroxide, chrome yellow, Prussian blue, phthalocyanine, clays, kieselguhr, silica, silica-alumina and titanium dioxide, and about 0.1 to 30 parts by weight of a dispersing aid consisting of the reaction product of 100 parts by weight of an isobutylene-isoprene copolymer having a mole percent unsaturation of about 5 to 50 and a Staudinger molecular weight of about 4,000 to 60,000, with about 10 to 100 parts by weight of a polar organic monomer containing a terminal $CH_2=C<$ group and selected from the group consisting of acrylonitrile, vinyl pyrimidine, vinyl pyridine, acrylic acid esters, methacrylic acid esters, vinyl ethers and vinyl esters.

9. A composition comprising a homogeneous admixture of about 100 parts by weight of a rubbery isobutylene-isoprene copolymer having an iodine No. of about 0.5 to 50 and having a Staudinger molecular weight of about 20,000 to 200,000, about 5 to 200 parts by weight of carbon black, and about 3 to 10 parts by weight of a dispersion aid consisting of the reaction product of about 100 parts by weight of an isobutylene-isoprene copolymer having a mole percent unsaturation of about 5 to 50 and a Staudinger molecular weight of about 4,000 to 60,000 with about 10 to 100 parts by weight of a polar organic monomer containing a terminal $CH_2=C<$ group and selected from the group consisting of acrylonitrile, vinyl pyrimidine, vinyl pyridine, acrylic acid esters, methacrylic acid esters, vinyl ethers and vinyl esters.

10. In a tubeless tire comprising an open-bellied body terminating in spaced bead portions, said body comprising an inner lining, an outer layer and an intermediate carcass layer, said inner, outer and intermediate layers being bonded together, the improvement comprising that said inner layer has a composition as defined in claim 1.

11. In a tubeless tire, comprising an open-bellied body terminating in spaced bead portions, said body comprising at least three layers bonded together, including an inner layer of a rubber which has been at least partially vulcanized, an intermediate carcass layer including a rubber vulcanizate and a plurality of tire cords, and an outer layer including a tread area and two sidewalls, the improvement consisting in that said sidewalls comprise a vulcanized composition according to claim 1.

References Cited in the file of this patent

UNITED STATES PATENTS

| | | |
|---|---|---|
| 2,609,353 | Rubens et al. | Sept. 2, 1952 |
| 2,634,256 | Sparks et al. | Apr. 7, 1953 |
| 2,720,499 | Doak | Oct. 11, 1955 |
| 2,795,262 | Frank | June 11, 1957 |
| 2,798,527 | Kindle et al. | July 9, 1957 |
| 2,838,456 | Banes et al. | June 10, 1958 |

OTHER REFERENCES

Mark et al.: Editors, "Collected Papers of W. H. Carothers on High Polymeric Substances," volume 1 of "High Polymers," page 392, published by Interscience, N.Y. (1940).